United States Patent
Kubo et al.

(10) Patent No.: US 9,339,951 B2
(45) Date of Patent: May 17, 2016

(54) RESIN-RELEASING JIG

(71) Applicant: Sumitomo Electric Fine Polymer, Inc., Sennan-gun, Osaka (JP)

(72) Inventors: Akito Kubo, Minato-ku (JP); Katsuya Yamada, Sennan-gun (JP); Kazuaki Ikeda, Sennan-gun (JP); Yasunori Nagaoka, Sennan-gun (JP); Kouji Mutou, Sennan-gun (JP); Noriaki Takami, Sennan-gun (JP)

(73) Assignee: SUMITOMO ELECTRIC FINE POLYMER, INC., Sennan-gun, Osaka (JP)

( * ) Notice: Subject to any disclaimer, the term of this patent is extended or adjusted under 35 U.S.C. 154(b) by 0 days.

(21) Appl. No.: 14/387,637

(22) PCT Filed: Mar. 29, 2013

(86) PCT No.: PCT/JP2013/059672
§ 371 (c)(1),
(2) Date: Sep. 24, 2014

(87) PCT Pub. No.: WO2013/147224
PCT Pub. Date: Oct. 3, 2013

(65) Prior Publication Data
US 2015/0037452 A1 Feb. 5, 2015

(30) Foreign Application Priority Data

Mar. 30, 2012 (JP) .................................. 2012-080625

(51) Int. Cl.
*B29C 33/62* (2006.01)
*B29C 47/12* (2006.01)
*B29C 47/08* (2006.01)
*B29C 47/20* (2006.01)

(52) U.S. Cl.
CPC ............. *B29C 33/62* (2013.01); *B29C 47/0852* (2013.01); *B29C 47/0883* (2013.01); *B29C 47/12* (2013.01); *B29C 47/20* (2013.01); *B29K 2827/12* (2013.01)

(58) Field of Classification Search
CPC ............ B29C 47/0019; B29C 47/0021; B29C 47/0852; B29C 47/0883; B29C 47/12; B29C 47/20; B29C 33/62
See application file for complete search history.

(56) References Cited

U.S. PATENT DOCUMENTS

| | | | |
|---|---|---|---|
| 4,324,748 A * | 4/1982 | Hatakeyama | B29C 47/12 264/338 |
| 6,203,651 B1 * | 3/2001 | Jarvenkyla | B29C 44/22 156/244.11 |
| 2010/0130690 A1 * | 5/2010 | Nanba | B29C 43/003 525/200 |

FOREIGN PATENT DOCUMENTS

| | | |
|---|---|---|
| JP | H05-220812 A | 8/1993 |
| JP | 2001-329069 A | 11/2001 |
| JP | 2003-156961 A | 5/2003 |
| JP | 2008-216639 A | 9/2008 |
| JP | 2012-025079 A | 2/2012 |
| KR | 2011 0118081 A | 10/2011 |

* cited by examiner

*Primary Examiner* — Yogendra Gupta
*Assistant Examiner* — Joseph Leyson
(74) *Attorney, Agent, or Firm* — Drinker Biddle & Reath LLP (57) ABSTRACT

Provided are a resin-releasing jig including a base and a releasing layer formed on a surface side of the base, in which the releasing layer is composed of a resin containing a perfluorinated polymer as a main component, and the perfluorinated polymer is crosslinked; and the resin-releasing jig further including a primer layer disposed between the base and the releasing layer, in which the primer layer is composed of a resin containing, as a main component, a perfluorinated polymer and an engineering plastic, the perfluorinated polymer in the primer layer is crosslinked, and the releasing layer has high abrasion resistance and a good adhesive force to the base and thus the resin-releasing jig has good durability. In particular, provided is the resin-releasing jig which is an extrusion molding mold used in an extruder for producing a long resin molded article.

6 Claims, 2 Drawing Sheets

RESIN-RELEASING JIG

TECHNICAL FIELD

The present invention relates to a resin-releasing jig including a contact portion that contacts a molten resin, and having a good property of releasing a resin from the contact portion.

BACKGROUND ART

Jigs including a contact portion that contacts a molten resin desirably have a good property of releasing a resin from the contact portion. For example, for a jig including a contact portion that contacts a molten resin that flows, such as an extrusion molding mold, an improvement in a releasing property is desired for the purpose of, for example, preventing the generation of "die lip build-up (also referred to as burr or die drool)", which may cause defects in products, decreasing the feeding/extrusion pressure (improvement in slipperiness), maintaining practical durability of the jig, and improving the appearance of products. This point will now be described using an extrusion molding mold as an example.

Figure 4:
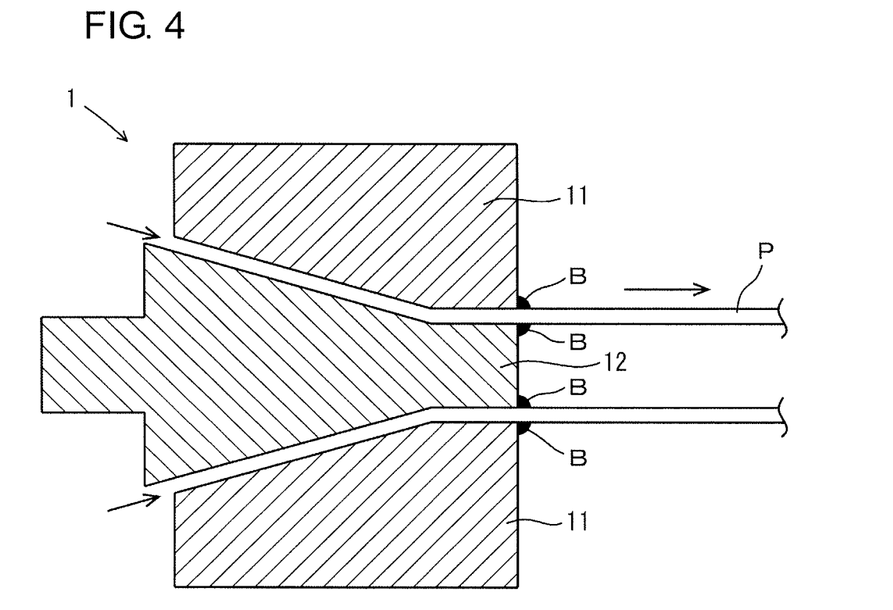
FIG. 4 is a cross-sectional view that schematically shows a structure of an extrusion molding mold in the related art.

In general, long resin molded articles such as wire coatings, wire tubes, and special products whose cross sections are special shapes are formed by extrusion molding. Extrusion molding is conducted by extruding a resin in a molten state from an extrusion molding mold with an extruder. FIG. 4 is a cross-sectional view that schematically shows an example of an extrusion molding mold used for molding a hollow product. In FIG. 4, reference numeral 1 denotes an extrusion molding mold, reference numeral 11 denotes a die, and reference numeral 12 denotes a point. A resin in a molten state is extruded in the direction shown by the arrow in the figure, and is solidified by air cooling or accelerated cooling. Thus, for example, a tube-shaped resin molded article P is produced. The cross-sectional shape of the resin molded article is substantially determined by the shapes of the extrusion molding mold, the die 11, the point 12, etc.

In conducting extrusion molding, a roughened appearance may be generated because some materials have poor slipperiness. Burrs B may also be generated on edges of the extrusion molding mold. In the case where molding is conducted by using such materials, additives for improving the slipperiness are used. However, in the cases where thermoplastic elastomers such as polyester elastomers or plastics containing rubber components are molded, even when additives are used, the generation of the burrs B on the edges of the extrusion molding mold cannot be sufficiently prevented.

Examples of known methods for suppressing the generation of such a roughened appearance and the generation of burrs B include providing a coating composed of polytetrafluoroethylene (PTFE), which has a good releasing property, and the use of an extrusion molding mold in which PTFE is embedded in a tip thereof (for example, PTL 1 and PTL 2).

CITATION LIST

Patent Literature

PTL 1: Japanese Unexamined Patent Application Publication No. 5-220812

PTL 2: Japanese Unexamined Patent Application Publication No. 2012-25079

SUMMARY OF INVENTION

Technical Problem

However, PTFE has low abrasion resistance, and PTFE is deformed by a resin pressure and the dimensional accuracy decreases. Therefore, the lifetime of an extrusion molding mold is short.

As in the above examples, regarding a jig including a contact portion that contacts a molten resin, a property of releasing a resin from the contact portion can be improved by coating the contacting portion with a fluororesin such as PTFE. However, fluororesins have problems in that, for example, abrasion resistance is low and the resins are easily deformed, which may result in a problem in terms of lifetime (durability) of the jig. Furthermore, fluororesins have a low adhesive force to a base that constitutes the jig. This shortcoming may also decrease durability of the jig.

In view of the problems in the related art, an object of the present invention is to provide a resin-releasing jig including a contact portion that contacts a molten resin, the resin-releasing jig including a releasing layer that provides a good property of releasing a resin from the contact portion and having good durability due to high abrasion resistance of the releasing layer and a good adhesive force of the releasing layer to a base.

Solution to Problem

As a result of intensive studies, the inventor of the present invention found that a releasing layer having not only a good releasing property but also high abrasion resistance and a high adhesive force to a base can be obtained by forming a releasing layer composed of a resin that mainly contains a perfluorinated polymer and crosslinking the perfluorinated polymer by irradiation with ionizing radiation or the like. The inventor of the present invention further found that the adhesive force between the releasing layer and the base is further improved and durability of the jig can be further improved by providing a primer layer containing a perfluorinated polymer and an engineering plastic as a main component between the releasing layer and the base composed of a metal or the like and crosslinking mainly the perfluorinated polymer in the primer layer by irradiation with ionizing radiation or the like. These findings led to the completion of the present invention.

A first aspect of the present invention provides a resin-releasing jig including a base and a releasing layer formed on a surface of the base, in which the releasing layer is composed of a resin containing a perfluorinated polymer as a main component, and the perfluorinated polymer is crosslinked.

A second aspect of the present invention provides a resin-releasing jig including a base, a primer layer formed on a surface of the base, and a releasing layer formed on a surface of the primer layer, in which the releasing layer is composed of a resin containing a perfluorinated polymer as a main component, the perfluorinated polymer is crosslinked, the primer layer is composed of a resin containing, as a main component, a perfluorinated polymer and an engineering plastic, and the perfluorinated polymer in the primer layer is mainly crosslinked.

A third aspect of the present invention provides
an extrusion molding mold used in an extruder for producing a long resin molded article, the extrusion molding mold including
a die and a coating layer composed of a perfluorinated polymer and disposed at at least a tip of a resin flow path of the die, in which the perfluorinated polymer is crosslinked by irradiation with ionizing radiation.

Advantageous Effects of Invention

According to the present invention, it is possible to provide a resin-releasing jig that includes a releasing layer having not only a good property of releasing a molten resin but also high abrasion resistance and a good adhesive force to a base, and that has good durability.

DESCRIPTION OF EMBODIMENTS

A first aspect of the present invention provides a resin-releasing jig including a base and a releasing layer formed on a surface side of the base, in which the releasing layer is composed of a resin containing a perfluorinated polymer as a main component, and the perfluorinated polymer is crosslinked.

A second aspect of the present invention provides a resin-releasing jig including a base, a primer layer formed on a surface of the base, and a releasing layer formed on a surface of the primer layer, in which the releasing layer is composed of a resin containing a perfluorinated polymer as a main component, the perfluorinated polymer is crosslinked, the primer layer is composed of a resin containing, as a main component, a perfluorinated polymer and an engineering plastic, and the perfluorinated polymer in the primer layer is mainly crosslinked.

The term "resin-releasing jig" in the first aspect and the second aspect refers to a jig including a portion (contact portion) that contacts a molten resin and having a good property of releasing a resin from the contact portion. The phrase "having a good releasing property" means that adhesion and close adhesion between a resin and a contact portion do not easily occur and releasability and slipperiness of the resin are good. The term "resin" covers the meaning of both a solidified resin and a molten resin. Accordingly, the phrase "having a good releasing property" also means that "adhesion and close adhesion between a molten resin and a contact portion do not easily occur and a flow resistance of the molten resin is low (slipperiness is good)".

Examples of the resin-releasing jig in the first aspect or the second aspect include devices for extruding, feeding, or molding a molten resin, such as a mold for resin molding. The inventions of the first aspect and the second aspect can be widely applied to jigs for which, in conducting, for example, extrusion, feeding, and molding of a molten resin, 1) prevention of the generation of die lip build-up (also referred to as burr or die drool), 2) a decrease in the feeding/extrusion pressure, 3) an improvement in the releasing property, etc. are desired and the maintenance of practical durability of the jigs are desired.

Specific examples of the resin-releasing jig include extrusion dies (such as an extrusion die, an extrusion point, a T die, an extrusion die mouthpiece, and accessory components and incidental components thereof) used for, for example, pelletizing a resin compound, covering a cable such as an electric wire or an optical fiber, or extruding a film, a tube, or a solid extrusion molded article; injection molds (such as an injection mold main body, components for feeding a material, and accessory components and incidental components); breaker plates in extruders; and press-forming molds such as a compression molding die. However, the target applications of the inventions of the first aspect and the second aspect are not limited to molds. The inventions of the first aspect and the second aspect are widely applied to jigs which include a contact portion that contacts a molten resin and which are desired to have a good property of releasing a resin from the contact portion.

The resin-releasing jigs of the first aspect and the second aspect each include a base and a releasing layer provided on a surface of the base either directly or with a primer layer etc. between the base and the releasing layer. The releasing layer is provided so as to cover a contact portion of the jig, the contact portion contacting a molten resin (for example, as a coating layer). In order to improve the releasing property, the entire contact portion is preferably covered with the releasing layer. Alternatively, a part of the contact portion may be covered with the releasing layer.

Examples of the material of the base include metals but are not limited thereto. The material of the base is not particularly limited as long as a releasing layer containing a perfluorinated polymer as a main component can be formed on a surface side of the base. Examples of the material of the base further include plastics.

The metal constituting the base can be widely selected from metals that are used in existing molds. Typical examples thereof include, but are not limited to, iron-based, SUS-based, Al-based, cemented carbide-based, brass-based, Ni-based, and Ti-based metals. Furthermore, the base may include, on a surface thereof, a rust preventive layer, a scratch-resistant layer, and the like composed of a metal oxide, a different type of alloy, or the like. The methods for forming the rust preventive layer, a scratch-resistant layer, and the like are also not limited. Any of an oxidation treatment, vapor deposition, plating, etc. may be employed.

The releasing layer is a layer composed of a resin containing a perfluorinated polymer as a main component. The term "perfluorinated polymer" refers to a polymer that does not contain hydrogen therein and that consists of carbon and fluorine or a polymer that contains carbon and fluorine and further contains oxygen or the like in a part thereof. Specific examples thereof include polytetrafluoroethylene (PTFE), tetrafluoroethylene/perfluoroalkylvinylether copolymers (PFA), and tetrafluoroethylene/hexafluoropropylene copolymers (FEP). These perfluorinated polymers may be commercially available. Such commercially available perfluorinated polymers may be used alone or as a mixture of two or more polymers. Alternatively, the copolymerization ratio may be changed or the polymers may be modified. Typically, commercially available perfluorinated polymers are used alone or as a mixture. Thus, the present invention provides the resin-releasing jig of the first aspect or the second aspect, in which the perfluorinated polymer is a resin selected from the group consisting of PTFE, PFA, and FEP.

The phrase "contains a perfluorinated polymer as a main component" means that the perfluorinated polymer is a component that is contained in the resin at the maximum content, preferably 50% by mass or more, and more preferably 80% by mass or more of the resin is a perfluorinated polymer, and other resins, in particular, a fluororesin may be contained as long as the object of the present invention is not impaired. The resin containing a perfluorinated polymer as a main component may be a resin containing only a perfluorinated polymer.

The perfluorinated polymer contained in the releasing layer of the resin-releasing jig of the first aspect or the second aspect is crosslinked. By crosslinking the perfluorinated polymer, abrasion resistance is improved and good adhesion between the releasing layer and the base or between the releasing layer and the primer layer can also be obtained.

Any known crosslinking method may be employed as the crosslinking method. From the viewpoint of the ease of control, a method using irradiation with ionizing radiation is preferable. Examples of the ionizing radiation used in the irradiation include charged particle radiation such as an electron beam and a high-energy ion beam, high-energy electromagnetic waves such as γ rays and X rays, and neutron radiation. In particular, an electron beam generation device is preferable because the cost is relatively low, an electron beam can be produced at a high output, and the degree of crosslinking can be easily controlled.

The crosslinking by irradiation with ionizing radiation is preferably conducted in a low-oxygen or oxygen-free atmosphere because the adhesive force between the releasing layer and the base is particularly improved. The effect of improving abrasion resistance and the adhesive force starts to be exhibited when the oxygen concentration at a pressure of 0.1 MPa is less than 1,000 ppm. The effect becomes apparent when the oxygen concentration is 500 ppm or less. The effect becomes more significant when the oxygen concentration is 100 ppm or less. In terms of substantial control by using a device, the concentration control in the range of about 5 to 10 ppm is easily stably performed on an industrial scale. Furthermore, in this range, in competitive reactions of decomposition and crosslinking/adhesion caused by radiation, the reaction of crosslinking/adhesion becomes significantly dominant. Accordingly, the low-oxygen or oxygen-free atmosphere is more preferably an atmosphere having an oxygen concentration of 500 ppm or less, still more preferably 100 ppm or less, and particularly preferably 10 ppm or less at a pressure of 0.1 MPa.

In order to accelerate crosslinking of the perfluorinated polymer and to suppress thermal decomposition thereof, the irradiation with ionizing radiation is preferably performed in a range from a melting point of the perfluorinated polymer to a temperature 80° C. higher than the melting point, and more preferably in a range from a melting point of the perfluorinated polymer to a temperature 40° C. higher than the melting point. For example, in the case where the perfluorinated polymer is PTFE, the irradiation with ionizing radiation is particularly preferably performed in the range of 327° C. to 340° C.

Thus, the present invention provides the resin-releasing jig of the first aspect or the second aspect, in which the perfluorinated polymer in the releasing layer is crosslinked by irradiation with ionizing radiation in an atmosphere having an oxygen partial pressure of 10 Pa or less in a range from a melting point of the perfluorinated polymer to a temperature 40° C. higher than the melting point.

The effect of the present invention can be obtained in a wide range of the dose of the ionizing radiation. Accordingly, the dose of the ionizing radiation is not particularly limited, and can be selected from a wide range. In particular, the dose is preferably about 50 to 800 kGy. When the dose of the ionizing radiation is excessively small, the crosslinking is insufficient and sufficient abrasion resistance is not obtained. On the other hand, when the dose of the ionizing radiation is excessively large, crosslinking/adhesion and degradation of the resin is in an equilibrium state and economic efficiency of the production may be decreased. Furthermore, abrasion resistance may be deceased by, for example, degradation of the resin. When the dose is in the range of 50 to 800 kGy, the crosslinking sufficiently proceeds and degradation of the resin is suppressed. Thus, sufficient abrasion resistance is obtained. Accordingly, a jig having high abrasion resistance can be more reliably provided by controlling the dose within this range.

Thus, the present invention provides the resin-releasing jig of the first aspect or the second aspect, in which the perfluorinated polymer in the releasing layer is crosslinked by irradiation with ionizing radiation, and the dose of the ionizing radiation is 50 to 800 kGy.

The thickness of the releasing layer containing a perfluorinated polymer as a main component can be appropriately selected in a range in which coating can be performed. The thickness of the releasing layer is appropriately preferably selected from a range of 5 to 300 μm in accordance with the use and purpose. When the thickness of the releasing layer is less than 5 μm, the releasing layer may be damaged by irregularities on a surface of the base, a compounding agent that is contained in an object of molding and feeding, or the like. As a result, for example, exposure of the base tends to occur. On the other hand, when the thickness of the releasing layer exceeds 300 μm, the possibility of the following problems occurring is increased. For example, it becomes difficult to form the layer. Defects such as cracks are easily generated. The number of steps of the production process is increased, resulting in an increase in the cost. The pressure-receiving area of an end of the layer is increased. Consequently, the coating layer succumbs to an extrusion pressure, and deformation of the coating layer and breaking such as abrasion or separation of the coating layer easily occur.

Thus, the present invention provides the resin-releasing jig of the first aspect or the second aspect, in which the releasing layer has a thickness in a range of 5 to 300 μm.

The primer layer included in the resin-releasing jig of the second aspect of the present invention is provided for the purpose of improving an adhesive force between the base of the jig and the releasing layer. Accordingly, the primer layer is provided on the base, and the releasing layer is provided on the primer layer. By providing this primer layer, adhesion between the base and the releasing layer is improved. As a result, a resin-releasing jig having higher reliability and higher durability can be provided. Specifically, according to the second aspect of the present invention, it is possible to provide a resin-releasing jig that includes a releasing layer having a good property of being released from a molten resin and high abrasion resistance, that has a particularly high adhesive force between the releasing layer and the base, and thus that has further improved durability and higher reliability.

Furthermore, the primer layer has an advantage that, for example, adhesion of a resin coating film can be maintained even during a process in which a resin is applied, baked, and then completely crosslinked to obtain an adhesive force to the base. Thus, the primer layer is effective to maintain the quality and stability of the quality of a product. That is, the primer layer has an effect of preventing a problem caused in the course of a process in which the base and the perfluorinated polymer are chemically bonded to each other by crosslinking, for example, the generation of floating and curling of the coating film after baking.

The primer layer included in the resin-releasing jig of the second aspect of the present invention contains, as a main component, a mixed resin of a perfluorinated polymer and an engineering plastic. The phrase "contains as a main component" means that a mixed resin of a perfluorinated polymer and an engineering plastic is a component that is contained in a resin constituting the primer layer at the maximum content, preferably 50% by mass or more, and more preferably 80% by mass or more of the resin is a mixed resin of a perfluorinated polymer and an engineering plastic, and other resins may be contained as long as the object of the present invention is not impaired. The primer layer may further contain a pigment and a filler for coloring and reinforcing a strength, for example, maintaining a hardness. The resin containing, as a main component, a mixed resin of a perfluorinated polymer and an engineering plastic may be a resin containing only a mixed resin of a perfluorinated polymer and an engineering plastic.

The term "perfluorinated polymer contained in the primer layer" refers to a perfluorinated polymer the same as the perfluorinated polymer that forms the releasing layer. The same resins as those used in the releasing layer can be selected as the perfluorinated polymer contained in the primer layer. Specifically, examples thereof include fluororesins such as PTFE, PFA, and FEP. The primer layer preferably contains, as a main component, at least one selected from these fluororesins. By forming the primer layer using a perfluorinated polymer as a main component, the adhesive force to the releasing layer is increased and thus a resin-releasing jig having higher reliability and excellent durability can be provided. The perfluorinated polymer contained in the releasing layer and the perfluorinated polymer contained in the primer layer may be different from each other. However, in the case where different perfluorinated polymers are used, perfluorinated polymers whose crystal melting points are close to each other, for example, PTFE and PFA, are preferably used in combination.

In the resin constituting the primer layer, an engineering plastic is incorporated in the perfluorinated polymer for the purpose of improving an adhesive force to a base (metal) or ensuring a close adhesive force to the base in the course of processing before crosslinking. Any general-purpose engineering plastic such as polyethersulfone (PES), polysulfone (PSF), polycarbonate (PC), polyamideimide (PAI), polyphenylene sulfide (PPS), or polyether ether ketone (PEEK) can be used as the engineering plastic without problems. A mixing ratio of the perfluorinated polymer and the engineering plastic is appropriately determined in accordance with the purpose, for example, from the viewpoint of enhancing the hardness of the coating film. From the viewpoint of the balance of the adhesive force between the base and the primer layer, a mixing ratio of the perfluorinated polymer relative to the total of the perfluorinated polymer and the engineering plastic is preferably 50% by mass or more, and more preferably 80% by mass or more. A mixing ratio of the engineering plastic relative to the total of the perfluorinated polymer and the engineering plastic is usually preferably 2% by mass or more (that is, the ratio of the perfluorinated polymer is 98% by mass or less).

The perfluorinated polymer contained in the primer layer is crosslinked by irradiation with ionizing radiation. Since the perfluorinated polymer is crosslinked, deformation of the primer layer is suppressed, and the adhesive forces between the primer layer and the base and between the primer layer and the releasing layer are also improved. Thus, a jig having higher durability can be provided.

It is possible to use crosslinking methods and conditions therefor that are similar to those in the case where the perfluorinated polymer contained in the releasing layer is crosslinked. The crosslinking of the primer layer is preferably performed after a releasing layer before crosslinking is formed on the primer layer and simultaneously with the crosslinking of the releasing layer. For example, a primer layer before crosslinking is formed on a base by coating or the like, and a releasing layer before crosslinking is then formed on the primer layer. The primer layer and the releasing layer are irradiated with ionizing radiation from the releasing layer side. Thus, the primer layer and the releasing layer are crosslinked at the same time. By performing the crosslinking of the primer layer and the crosslinking of the releasing layer at the same time, the adhesive force between the primer layer and the releasing layer is improved.

The thickness of the primer layer is usually preferably in a range of 5 to 20 µm, but is not particularly limited because the range of the thickness to be selected varies depending on the purpose of the primer layer. When the thickness of the primer layer is 5 µm or less, the layer is not partially formed in some surface states of the base, and adhesion with the target base may become unstable. On the other hand, when the thickness of the primer layer exceeds 20 µm, there may be a problem in that, for example, defects are easily generated in the coating film.

A third aspect of the present invention provides an extrusion molding mold used in an extruder for producing a long resin molded article, the extrusion molding mold including a die and a coating layer composed of a perfluorinated polymer, the coating layer being disposed at at least a tip of a resin flow path of the die, in which the perfluorinated polymer is crosslinked by irradiation with ionizing radiation.

The extrusion molding mold of the third aspect of the present invention is one embodiment of the resin-releasing jig of the first aspect. Accordingly, perfluorinated polymers the same as those used in the first aspect are used as the perfluorinated polymer. Examples thereof include PTFE, PFA, and FEP. The coating layer corresponds to the releasing layer in the first aspect. The resin flow path of the die corresponds to the contact portion that contacts a molten resin in the first aspect.

In the extrusion molding mold of the third aspect, a coating layer composed of a perfluorinated polymer and having a good releasing property is provided at at least a tip of a resin flow path of a die. Accordingly, a roughened appearance of a resin molded article and the generation of a burr on an edge of the die are suppressed.

Furthermore, since the perfluorinated polymer is crosslinked, abrasion resistance of the perfluorinated polymer is improved. The adhesion of the perfluorinated polymer with the mold is also improved. Furthermore, since the perfluorinated polymer is provided by coating rather than embedding, deformation of the perfluorinated polymer by a resin pressure is prevented. Therefore, the lifetime of the extrusion molding mold can be extended. That is, according to the third aspect of the present invention, a roughened appearance of a resin molded article and the generation of a burr can be sufficiently suppressed and an extrusion molding mold having a long lifetime can be provided.

The present invention provides the extrusion molding mold of the third aspect, the extrusion molding mold further including a point in addition to the die, and a layer composed of a perfluorinated polymer, the layer being disposed at at least a tip of a resin flow path of the point, in which the perfluorinated polymer is crosslinked by irradiation with ionizing radiation.

In this invention, at least a tip of a resin flow path of the point in addition to the die is coated with a crosslinked perfluorinated polymer. Accordingly, the roughened appearance of a resin molded article can be further suppressed, and it is possible to suppress the generation of a die lip build-up (burr) on the edges of the die and the point, that is, on both the outer circumference and the inner circumference of the molded article.

As in the case where only a surface of the die is coated with a perfluorinated polymer, the perfluorinated polymer on a surface of the point is crosslinked. Accordingly, abrasion resistance of the perfluorinated polymer is improved and the adhesion between the perfluorinated polymer and the mold is improved. Furthermore, since the perfluorinated polymer is provided by a coating method, deformation of the perfluorinated polymer by a resin pressure is prevented. Therefore, the lifetime of the mold can be extended.

The irradiation with ionizing radiation for crosslinking the resin is preferably performed under the same conditions as those of the invention of the first aspect and the invention of the second aspect. Specifically, in order to accelerate crosslinking of the perfluorinated polymer and to suppress thermal decomposition thereof, the irradiation with ionizing radiation is performed in a low-oxygen or oxygen-free atmosphere preferably in a range from a melting point of the perfluorinated polymer to a temperature 80° C. higher than the melting point, and more preferably in a range from a melting point of the perfluorinated polymer to a temperature 40° C. higher than the melting point. In the case where PTFE is used as the perfluorinated polymer, the irradiation with ionizing radiation is particularly preferably performed in the range of 327° C. to 340° C. The ionizing radiation is preferably an electron beam.

Regarding the materials of the die and the point, materials of the base the same as those used in the invention of the first aspect and the invention of the second aspect can be used. Examples of the materials include metals but are not limited thereto. Examples of the materials of the base further include plastics. Examples of the metals include, but are not limited to, iron-based, SUS-based, Al-based, cemented carbide-based, brass-based, Ni-based, and Ti-based metals.

In the invention of the third aspect, among the above metals, stainless steels or cemented carbides are preferably used. Stainless steels and cemented carbides have high rigidity and good corrosion resistance. Accordingly, regarding the die and the point each of which includes a base composed of such a material, the base having a surface coated with a crosslinked perfluorinated polymer, deformation of the perfluorinated polymer by a resin pressure is suppressed, and corrosion of the base can be prevented even if a pinhole is formed in the coating of the perfluorinated polymer. Therefore, when the die and the point are used as an extrusion molding mold, a roughened appearance can be sufficiently suppressed, and an extrusion molding mold having a long lifetime can be provided.

Preferable examples of the stainless steels include SUS 440C, SUS 304, and SUS 310S. Preferable examples of the cemented carbides include WC—Co alloys, WC—Co—Ni—Cr alloys, and WC—Co—Cr alloys.

The coating layer in the extrusion molding mold of the third aspect corresponds to the releasing layer in the first aspect and the second aspect. Accordingly, the thickness of the coating layer can be appropriately selected in a range in which coating can be performed, but is preferably in the range of 5 to 300 μm. The thickness of the coating layer of the extrusion molding mold is more preferably 50 μm or less. Even when the coating layer has a small thickness, a roughened surface of a resin molded article is sufficiently prevented. In addition, when the coating layer has a small thickness, deformation by a resin pressure is further suppressed. As a result, an extrusion molding mold having a longer lifetime can be provided.

In the extrusion molding mold of the third aspect, by providing a primer layer on a base of a die or a point and providing the coating layer on the primer layer, the adhesion between the base of the mold and the coating layer is improved. This structure is preferable because an extrusion molding mold having higher reliability and a longer lifetime can be consequently provided. This case corresponds to a case where the resin-releasing jig of the second aspect is specified to an extrusion molding mold.

An extrusion molding mold of the third aspect will now be described on the basis of embodiments. It should be noted that these embodiments are examples of the present invention and do not limit the scope of the present invention.

Embodiment 1

The present embodiment relates to an extrusion molding mold in which a coating layer is provided on a surface of a resin flow path of a die.

Figure 1:
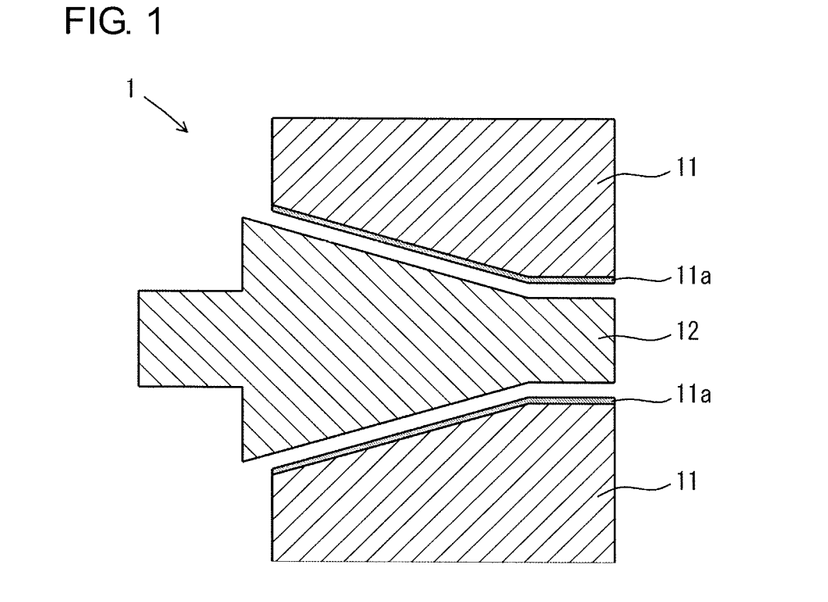
FIG. 1 is a cross-sectional view that schematically shows a structure of an extrusion molding mold according to an embodiment of the third aspect of the present invention.

FIG. 1 is a cross-sectional view that schematically shows a structure of an extrusion molding mold according to the present embodiment. Reference numeral 1 denotes an extrusion molding mold, reference numeral 11 denotes a die, reference numeral 11a denotes a coating layer, and reference numeral 12 denotes a point.

The material of the die 11 and the point 12 is preferably a stainless steel such as SUS 440C or a cemented carbide such as a WC—Co alloy, as described above.

The coating layer 11a is formed by coating a surface of a resin flow path of the die 11 with a perfluorinated polymer, and then irradiating the perfluorinated polymer with ionizing radiation to crosslink the perfluorinated polymer. Examples of a method for applying the perfluorinated polymer include a method in which a film composed of perfluorinated polymer is applied and a method of powder coating. For example, in the case where the perfluorinated polymer is PTFE, examples of the method further include a method in which a PTFE powder is applied by electrostatic coating, a method in which a PTFE powder is sprayed, and a method including applying a PTFE dispersion and then removing a dispersion medium by drying.

Among these methods, the method including applying a PTFE dispersion is a preferable method from the viewpoint that the coating layer 11a having a uniform thickness can be easily formed. In this case, a mixed solvent of water and an emulsifier; water and an alcohol; water and acetone; water, an alcohol, and acetone; or the like can be used as the dispersion medium. After the PTFE dispersion is applied, the dispersion medium is removed by drying, specifically, by either air drying or hot air drying.

After the coating with the perfluorinated polymer, baking is performed at a temperature equal to or higher than the melting point of the perfluorinated polymer (primary baking). Perfluorinated polymer particles are melted and bound to each other by the primary baking. The primary baking is preferably performed in the temperature range of 350° C. to 400° C. A drying step may be performed before the baking.

Alternatively, the dispersion medium may be removed during a temperature-increasing process of a usual baking step without intentionally performing a drying step.

Subsequently, the perfluorinated polymer is irradiated with ionizing radiation to crosslink the perfluorinated polymer. Thus, the coating layer 11a is formed. The irradiation with ionizing radiation is conducted in a low-oxygen or oxygen-free atmosphere. The effect of improving abrasion resistance and the adhesive force starts to be exhibited when the oxygen concentration at a pressure of 0.1 MPa is less than 1,000 ppm (oxygen partial pressure: 100 Pa). The effect becomes apparent when the oxygen concentration is 500 ppm (oxygen partial pressure: 50 Pa) or less. The effect becomes more significant when the oxygen concentration is 100 ppm (oxygen partial pressure: 10 Pa) or less. In terms of substantial control by using a device, the concentration control in the range of about 5 to 10 ppm is easily stably performed on an industrial scale. Furthermore, in this range, in competitive reactions of decomposition and crosslinking/adhesion caused by radiation, the reaction of crosslinking/adhesion becomes significantly dominant. Accordingly, the low-oxygen or oxygen-free atmosphere is more preferably an atmosphere having an oxygen concentration of 500 ppm (oxygen partial pressure: 50 Pa) or less, still more preferably 100 ppm (oxygen partial pressure: 10 Pa) or less, and particularly preferably 10 ppm (oxygen partial pressure: 1 Pa) or less at a pressure of 0.1 MPa. The temperature at which the irradiation with ionizing radiation is performed is preferably in the range from (melting point of perfluorinated polymer) to (melting point+80° C.), and particularly preferably in the range from (melting point of perfluorinated polymer) to (melting point+40° C.). In the case where the perfluorinated polymer is PTFE, a range of 327° C. to 340° C., for example, 340° C. is particularly preferable.

The dose is preferably 50 to 800 kGy, as described above. Irradiation with ionizing radiation may be performed at the same time of the baking. By performing irradiation with ionizing radiation in this manner, abrasion resistance is improved and adhesion (peel strength) between the die 11 and the coating layer 11a is improved.

The thickness of the coating layer 11a is preferably 50 µm or more. In order to suppress deformation, the thickness of the coating layer 11a is more preferably 20 to 40 µm.

Examples of the ionizing radiation used in the irradiation include charged particle radiation such as an electron beam and a high-energy ion beam, high-energy electromagnetic waves such as γ rays and X rays, and neutron radiation. An electron beam is preferably used. The accelerating voltage is appropriately determined in accordance with the thickness of the coating layer, etc.

Embodiment 2

The present embodiment differs from Embodiment 1 in that a coating layer is provided on a surface of a flow path of a point in addition to a surface of a resin flow path of a die.

Figure 2:
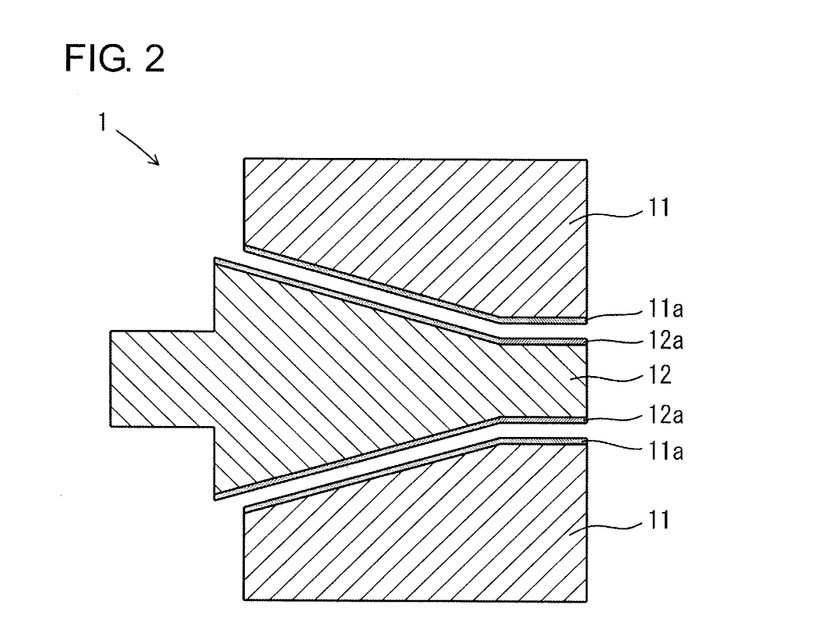
FIG. 2 is a cross-sectional view that schematically shows a structure of an extrusion molding mold according to another embodiment of the third aspect of the present invention.

FIG. 2 is a cross-sectional view that schematically shows a structure of an extrusion molding mold according to the present embodiment. Reference numeral 12a denotes a coating layer formed on a surface of a resin flow path of a point 12.

In the present embodiment, a roughened appearance on the flow path side of the point 12 can also be suppressed, and the generation of a burr on the edge of the point 12 can be suppressed.

Embodiment 3

The present embodiment differs from Embodiment 1 in that a coating layer is provided on a primer layer containing PFA.

Figure 3:
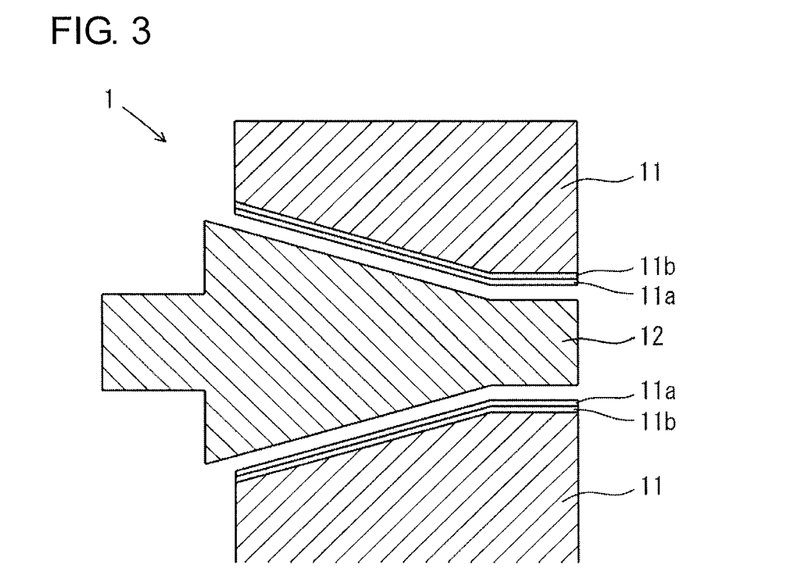
FIG. 3 is a cross-sectional view that schematically shows a structure of an extrusion molding mold according to still another embodiment of the third aspect of the present invention.

FIG. 3 is a cross-sectional view that schematically shows a structure of an extrusion molding mold according to the present embodiment. Reference numeral 11b denotes a primer layer.

The primer layer 11b is formed by coating a surface of a resin flow path of a die 11 with a primer resin composed of a perfluorinated polymer and an engineering plastic. Examples of the perfluorinated polymer constituting the primer resin include PTFE, PFA, and FEP. Any method that is usually used for coating of PTFE, PFA, or the like can be used as a method for applying the primer resin. A perfluorinated polymer contained in the coating layer 11a, which is a top coating layer, may be any of PTFE, PFA, and FEP regardless of the type of fluororesin component (perfluorinated polymer) contained in the primer resin. A mixture of any of these polymers may be used.

The primer layer 11b is preferably crosslinked by irradiation with ionizing radiation as in the coating layer 11a. As a result, adhesion with the die 11 can be further improved. For example, after the coating layer 11a is formed, the primer layer 11b and the coating layer 11a are irradiated with ionizing radiation at the same time.

A description has been made of examples in which the coating layers 11a and 12a are formed over the entire surfaces of the resin flow paths of the die 11 and the point 12. Alternatively, the coating layers 11a and 12a may be formed only on a tip of a mold (outlet portion of a resin flow path).

The extrusion molding molds of the above embodiments each include a point in order to mold a hollow product. However, in the case where the cross-sectional shape of a resin molded article formed by extrusion molding is a circle, that is, in the case where a resin molded article formed by extrusion molding is a solid rod (solid extrusion molded article), or in the case where a resin molded article formed by extrusion molding is a resin molded article having a special cross-sectional shape (special-shaped extrusion molded article), the point is not used. The third aspect of the present invention also covers such an extrusion molding mold.

EXAMPLES

Next, the present invention will be described more specifically using Examples.

Examples 1 and 2 and Comparative Examples 1 to 3

1. Preparation of Extrusion Molding Mold

Example 1

A die and a point that were composed of SUS 440C were prepared. A surface of a resin flow path of the die was coated with a PTFE layer having a thickness of 30 µm. Subsequently, the die was heated to 340° C. in an inert gas atmosphere having an oxygen concentration of 5 ppm, and the PTFE layer was irradiated with an electron beam at an accelerating voltage of 1,100 kV at an effective dose of 200 kGy. Thus, an extrusion molding mold for molding a tubular resin molded article having an outer diameter of 2.2 mm and an inner diameter of 1.3 mm was prepared.

Example 2

An extrusion molding mold was prepared by the same method as that used in Example 1 except that a coating layer was also formed on a surface of a resin flow path of a point by the same method as that used for forming a coating layer on a surface of a resin flow path of a die.

Comparative Example 1

An extrusion molding mold was prepared by the same method as that used in Example 1 except that irradiation with an electron beam was not performed.

Comparative Example 2

A die and a point that were composed of SUS 440C were prepared. A surface of a resin flow path of the die was subjected to Kanigen plating (nickel-fluororesin eutectoid plating). Thus, an extrusion molding mold for molding a tubular resin molded article having an outer diameter of 2.2 mm and an inner diameter of 1.3 mm was prepared.

Comparative Example 3

A die and a point that were composed of SUS 440C were prepared. A surface of a resin flow path of the die was coated with diamond-like carbon (DLC). Thus, an extrusion molding mold for molding a tubular resin molded article having an outer diameter of 2.2 mm and an inner diameter of 1.3 mm was prepared.

2. Evaluations of Extrusion Molding Mold (1) Evaluation Methods
A. Roughened Appearance
A polyester elastomer resin was extrusion-molded at 170° C. Roughened appearance was evaluated by examining irregularities on the surface of the resulting resin molded article with a surface roughness meter.
B. Generation of Burr
The occurrence or nonoccurrence of the generation of a burr during extrusion molding of the polyester elastomer resin was examined by measuring the weight of burrs per 100 m.
C. Abrasion Resistance
Abrasion resistance of the coating layer was evaluated by a thrust abrasion test (Ring-on-Disk type wear test) in accordance with JIS K-7218 using a rotation abrasion tester. Specifically, a metal cylinder (S45 ring: outer diameter/inner diameter=φ11.6/7.4) was placed on a test sample. The cylinder was rotated at 1,800 rpm for 10 minutes while a predetermined load was applied to the cylinder. Thus, an abrasion state of the test sample was measured.
D. Deformation
Deformation of the coating layer was measured with a micrometer.
E. Generation of Die Lip Build-Up
The generation of die lip build-up was measured by visual observation.
F. Effect of Reducing Extrusion Pressure
An extrusion pressure when a polyester elastomer resin was extrusion-molded at 170° C. was measured. The same measurement was conducted by using an extrusion molding mold which was prepared as in the extrusion molding mold used in Example 1 except that the coating of PTFE was not performed. When the extrusion pressure was significantly lower than the extrusion pressure measured by using this extrusion molding mold that was not coated with PTFE, the extrusion molding mold was evaluated as acceptable. When the extrusion pressure was not substantially reduced, the extrusion molding mold was evaluated as unacceptable. It is believed that a mold that has a good effect of reducing an extrusion pressure also has a good effect of increasing the extrusion rate and a good effect of decreasing an extrusion temperature.

(2) Evaluation Results
In Comparative Example 1, a roughened appearance and the generation of a burr on the edge of the die were observed. In contrast, in Examples 1 and 2, a roughened appearance was not observed. It was found that the generation of a burr on the edge of the die was suppressed in Example 1, and the generation of a burr on the edges of both the die and the point was suppressed in Example 2. It was also found that abrasion resistance of the coating layers of Examples 1 and 2 was improved as compared with that in Comparative Example 1. It was also found that deformation of the coating layers was sufficiently suppressed in Examples 1 and 2.

In contrast, in Comparative Example 1, abrasion resistance was low. The effect of preventing the generation of die lip build-up and the effect of reducing the extrusion pressure disappeared within several minutes to several tens of minutes from the start of extrusion. Specifically, the coating layer was lost by abrasion or separation, showing that practical durability was insufficient. It was confirmed that until the effect of preventing the generation of die lip build-up and the effect of reducing the extrusion pressure disappeared, these effects were good in Comparative Example 1 as in the cases of Examples 1 and 2.

Regarding durability such as abrasion resistance, a good effect was confirmed in Comparative Examples 2 and 3 as in Examples 1 and 2. However, the effect of preventing the generation of die lip build-up and the effect of reducing the extrusion pressure in Comparative Examples 2 and 3 were significantly lower than those in Examples 1 and 2.

Example 3

1. Preparation of Extrusion Molding Mold

An extrusion molding mold was prepared by the same method as that used in Example 2 except that surfaces of a resin flow path of a die and a point were coated with a primer resin composed of PFA and PES and having a thickness of 10 µm to form a primer layer, and the surface of the primer layer was then coated with PTFE.

2. Evaluations of Extrusion Molding Mold (1) Evaluation Method
Adhesion between the coating layer and the die was measured by a cross-cut adhesion test (in accordance with JIS K-5400, the 1980 edition). For comparison, the same measurement was conducted for the coating layer of Example 2. Specifically, scratches were formed on a coating layer of a sample so as to form 100 grid squares. A tape was applied thereon, and then peeled off. This test was repeatedly performed 500 times. The adhesion was evaluated by the number of grid squares that remained without being peeled off.
(2) Evaluation Results
In Example 2, the number of grid squares that remained was 97 out of 100, whereas, in Example 3, 100 grid squares out of 100 remained. It was confirmed that adhesion of the coating layer was improved by forming the primer layer composed of PFA and PES.

Examples 4 to 7

1. Preparation of Extrusion Molding Mold

Extrusion molding molds of Examples 4 to 7 were prepared by the same method as that used in Example 1 except that the dose of an electron beam was changed to 50 kGy, 200 kGy, 500 kGy, and 800 kGy, respectively.

2. Evaluations of Extrusion Molding Mold (1) Evaluation Method

Abrasion resistance of the coating layer was measured by the same method described above.

(2) Evaluation Results

It was found that abrasion resistances of Examples 5 and 6 were higher than those of Examples 4 and 7. The reason for this is as follows. In Example 4, since the dose is low, crosslinking of the coating layer is insufficient. In Example 7, since the dose is excessively high, decomposition of the resin occurs. On the other hand, in Examples 5 and 6, the dose is appropriate and the coating layer is moderately cross-linked.

Examples 8 to 10

1. Preparation of Extrusion Molding Mold

Extrusion molding molds in Examples 8 to 10 were prepared by the same method as that used in Example 1 except that the thickness of the coating layer was changed to 10 µm, 50 µm, and 100 µm, respectively.

2. Evaluations of Extrusion Molding Mold (1) Evaluation Method

Deformation of the coating layer was measured by the same method described above.

(2) Evaluation Results

It was found that deformation in Examples 8 and 9 was smaller than that in Example 10. This is because the coating layer of Example 10 has a large thickness whereas the coating layers of Examples 8 and 9 have small thicknesses.

Examples 11 to 13

Resin layers were each formed by applying PTFE (manufactured by Daikin Industries, Ltd., EK-3700: Example 11), PFA (manufactured by Dupont, MP-10: Example 12), or FEP (manufactured by Daikin Industries, Ltd., NL-1500: Example 13) on a base (no surface treatment) composed of aluminum (AL3003) and having a length of 10 cm, a width of 10 cm, and a thickness of 1.5 mm. The resin layer in Example 11 (in the case of PTFE) had a thickness of 30 µm. The resin layer in Example 12 (in the case of PFA) had a thickness of 50 µm. The resin layer in Example 13 (in the case of FEP) had a thickness of 30 µm. Subsequently, the resin layers were each subjected to a primary baking by being kept at the temperature shown in Table I for 10 minutes in air at 1 atm. After the primary baking, the resin layers were each kept for 10 minutes in an oven in a nitrogen atmosphere (1 atm) containing oxygen in the concentration shown in Table I, and irradiated with an electron beam at the effective dose shown in Table I at the temperature shown in Table I to crosslink PTFE, PFA or FEP. Thus, releasing layers were formed to prepare samples. The adhesive force and abrasion resistance of each of the samples were evaluated. Table I shows the results.

Evaluation of Adhesive Force:

Adhesion between the base and the releasing layer was evaluated by conducting the same test as the cross-cut adhesion test (in accordance with JIS K-5400, the 1980 edition) in Example 3. A tape was applied onto the sample, and then peeled off. This test was repeatedly performed 100 times. When the number of grid squares that were peeled off was zero, it was determined that the sample was acceptable.

Evaluation of Abrasion Resistance:

Abrasion resistance of the releasing layer was evaluated by the same method and under the same conditions as those used in the evaluation of abrasion resistance in Examples 1 and 2. Specifically, a metal cylinder (S45 ring: outer diameter/inner diameter=φ11.6/7.4) was placed on a test sample. The cylinder was rotated at 1,800 rpm for 10 minutes while a predetermined load was applied to the cylinder. Thus, an abrasion state of the test sample was measured. When rapid abrasion of a material was not observed until the load was increased to 15 MPa, it was determined that the sample was acceptable.

TABLE I

| | | Primary baking | | Crosslinking | | | Evaluation results | |
|---|---|---|---|---|---|---|---|---|
| Example No. | Coating material | Temperature °C. | Atmosphere | Temperature °C. | Oxygen concentration ppm | Dose kGy | Adhesive force | Abrasion resistance |
| 11 | PTFE | 380 | Air | 340 | 5 to 10 | 200 | Acceptable | Acceptable |
| 12 | PFA | 380 | Air | 320 | 5 to 10 | 200 | Acceptable | Acceptable |
| 13 | FEP | 380 | Air | 300 | 5 to 10 | 200 | Acceptable | Acceptable |

All the bases were composed of aluminum (AL3003: no surface treatment).

The results in Table I show that even in the case where the perfluorinated polymer is any of PTFE (melting point: 327° C.), PFA (melting point: 310° C.), and FEP (melting point: 275° C.), by applying the perfluorinated polymer onto a base, and irradiating the perfluorinated polymer with an electron beam at a temperature in a range from the melting point of the perfluorinated polymer to the melting point+40° C. in a low-oxygen atmosphere to crosslink the perfluorinated polymer, a releasing layer having a good adhesive force to the base and good abrasion resistance can be obtained.

Examples 14 to 21

Resin layers having a thickness of 50 µm were each formed by applying, by powder coating, PFA (manufactured by Dupont, MP-10) onto a base (no surface treatment) composed of the material described in Table II and having a length of 10 cm, a width of 10 cm, and a thickness of 1.5 mm. Subsequently, the resin layers were each subjected to a primary baking by being kept at the temperature shown in Table II for 10 minutes in the atmosphere shown in Table II. After the primary baking, the resin layers were each kept for 10 minutes in an oven in a nitrogen atmosphere (1 atm) containing oxygen in the concentration shown in Table II, and irradiated with an electron beam at the effective dose shown in Table II at the temperature shown in Table II to crosslink PFA. Thus, releasing layers were formed to prepare samples. The adhesive force and abrasion resistance of each of the samples were evaluated by the same method and under the same conditions as those used in Example 11. Table II shows the results.

described below onto a base (no surface treatment) composed of a steel (SPCC) and having a length of 10 cm, a width of 10 cm, and a thickness of 1.5 mm, and then baking the mixed resin.

Mixed resin used in Example 22: PFA+polyethersulfone (PES)

TABLE II

| Example No. | Coating material | Base* | Primary baking Temperature °C. | Atmosphere | Crosslinking Temperature °C. | Oxygen concentration ppm | Dose kGy | Evaluation results Adhesive force | Abrasion resistance |
|---|---|---|---|---|---|---|---|---|---|
| 14 | PFA | Aluminum | 380 | Low-oxygen atmosphere, oxygen concentration: 5 to 10 ppm | 320 | 5 to 10 | 200 | Acceptable | Acceptable |
| 15 | PFA | Steel | 380 | | 320 | 5 to 10 | 200 | Acceptable | Acceptable |
| 16 | PFA | SUS | 380 | | 320 | 5 to 10 | 200 | Acceptable | Acceptable |
| 17 | PFA | PI | 380 | | 320 | 5 to 10 | 200 | Acceptable | Acceptable |
| 18 | PFA | Aluminum | 380 | Air | 320 | 5 to 10 | 200 | Acceptable | Acceptable |
| 19 | PFA | Steel | 380 | | 320 | 5 to 10 | 200 | Unacceptable | Unacceptable |
| 20 | PFA | SUS | 380 | | 320 | 5 to 10 | 200 | Unacceptable | Acceptable |
| 21 | PFA | PI | 380 | | 320 | 5 to 10 | 200 | Acceptable | Acceptable |

*Base Aluminum: AL3003, Steel: SPCC, SUS: SUS 304
PI: polyamideimide (Vespel SP-1) (All the bases were not subjected to a surface treatment.)
All the releasing layers were formed by using PFA.

The results in Table II show that even in the case where the base is any metal selected from aluminum, a steel, and a SUS or a plastic such as polyamideimide, by applying a perfluorinated polymer (PFA) onto the base, and irradiating the perfluorinated polymer with an electron beam at a temperature in the range from the melting point of the perfluorinated polymer to the melting point+80° C., more preferably, melting point+40° C. in a low-oxygen atmosphere to crosslink the perfluorinated polymer, a releasing layer having a good adhesive force to the base and good abrasion resistance can be obtained. Referring to the results shown in Table II, in the case where the base is composed of aluminum or PI, the atmosphere (the presence or absence of oxygen) of the primary baking does not substantially affect the evaluation results (Examples 18 and 21). However, in the case where the base is composed of a steel or a SUS, the results of the adhesive force and abrasion resistance are significantly changed (Examples 19 and 20: specifically, a sufficient adhesive force and/or sufficient abrasion resistance is not obtained). Accordingly, in the cases of these bases, the primary baking is also preferably performed in a low-oxygen atmosphere.

Examples 22 and 23

Primer layers having a thickness of 10 μm were each formed by applying a mixed resin having a composition Mixed resin used in Example 23: PFA+polyamideimide (PAI)

In Examples 22 and 23, the coating of the mixed resin was performed as follows. An engineering plastic of PES or PAI was dissolved in a solvent such as N-methylpyrrolidone (NMP) to prepare a solution. A fluororesin of PFA was dispersed in the solution to prepare a dispersion liquid. The dispersion liquid was then applied onto the base.

Subsequently, PTFE (manufactured by Daikin Industries, Ltd., EK-3700) was applied onto each of the primer layers formed as described above to form resin layers each having a thickness of 30 μm. Subsequently, the resin layers were each subjected to a primary baking by being kept at the temperature shown in Table III for 10 minutes in the atmosphere shown in Table III. After the primary baking, the resin layers were each kept for 10 minutes in an oven in a nitrogen atmosphere (1 atm) containing oxygen in the concentration shown in Table III, and irradiated with an electron beam at the effective dose shown in Table III at the temperature shown in Table III to crosslink the resins in the primer layer and the resin layer. Thus, releasing layers were formed to prepare samples. The adhesive force and abrasion resistance of each of the samples were evaluated by the same method and under the same conditions as those used in Example 11. Table III shows the results

TABLE III

| Example No. | Primer layer | Primary baking Temperature °C. | Atmosphere | Crosslinking Temperature °C. | Oxygen concentration (ppm) | Dose kGy | Evaluation results Adhesive force | Abrasion resistance |
|---|---|---|---|---|---|---|---|---|
| 22 | PFA/PES | 380 | Air | 320 | 5 to 10 | 200 | Acceptable | Acceptable |
| 23 | PFA/PAI | 380 | Air | 320 | 5 to 10 | 200 | Acceptable | Acceptable |

All the bases were composed of a steel (SPCC: no surface treatment).
All the releasing layers were formed by using PFA.

As shown in Table II (Example 19), when the base is composed of a steel and the primary baking is performed in air, a sufficient adhesive force and sufficient abrasion resistance are not obtained. In contrast, as shown in Table III (Examples 22 and 23), in the case where the primer layer is provided (Examples 22 and 23), even when the base is composed of a steel and the primary baking is performed in air, a satisfactory adhesive force and satisfactory abrasion resistance are obtained.

The present invention has been described on the basis of embodiments, but the present invention is not limited to the above embodiments. Various modifications may be made to the above embodiments within the scope the same as or equivalent to that of the present invention.

REFERENCE SIGNS LIST 1 extrusion molding mold
11 die
11a, 12a coating layer
11b primer layer
12 point
B burr

The invention claimed is:

1. A resin-releasing jig comprising a base; a primer layer formed on a surface of the base; and a releasing layer formed on a surface of the primer layer, wherein the releasing layer is composed of a resin containing a perfluorinated polymer as a main component, and the perfluorinated polymer is crosslinked, the primer layer is composed of a resin containing, as a main component, a perfluorinated polymer and a resin selected from the group consisting of polyethersulfone (PES), polysulfone (PSF), polycarbonate (PC), polyamide-imide (PAI), polyphenylene sulfide (PPS), and polyether ether ketone (PEEK), and the perfluorinated polymer in the primer layer is crosslinked.

2. The resin-releasing jig according to claim 1, wherein the content of the perfluorinated polymer contained in the resin is 50% by mass or more.

3. The resin-releasing jig according to claim 1, wherein the perfluorinated polymer in the releasing layer is a resin selected from the group consisting of polytetrafluoroethylene, a tetrafluoroethylene/perfluoroalkylvinylether copolymer, and a tetrafluoroethylene/hexafluoropropylene copolymer.

4. The resin-releasing jig according to claim 1, wherein the perfluorinated polymer in the releasing layer is crosslinked by irradiation with ionizing radiation in an atmosphere having an oxygen concentration corresponding to 100 ppm or less at a pressure of 0.1 MPa in a range from a melting point of the perfluorinated polymer to a temperature 40° C. higher than the melting point.

5. The resin-releasing jig according to claim 4, wherein the perfluorinated polymer in the releasing layer is crosslinked by irradiation with ionizing radiation, and the dose of the ionizing radiation is 50 to 800 kGy.

6. The resin-releasing jig according to claim 1, wherein the releasing layer has a thickness in a range of 5 to 300 μm.

* * * * *